United States Patent [19]

Urban

[11] 4,287,820
[45] Sep. 8, 1981

[54] SPIRAL MEAT SLICER

[75] Inventor: Robert F. Urban, Painesville, Ohio

[73] Assignee: National Ham Company, Cleveland, Ohio

[21] Appl. No.: 943,312

[22] Filed: Sep. 15, 1978

[51] Int. Cl.³ .......................... A23N 7/00; A47J 17/00
[52] U.S. Cl. ...................................... 99/538; 99/537; 99/593; 99/594; 99/597; 200/47
[58] Field of Search ................ 99/537, 538, 541, 593, 99/594, 491, 492, 595-599; 17/1 G; 83/451, 471.2, 483, 488, 703, 704; 82/48; 200/47

[56] References Cited
U.S. PATENT DOCUMENTS

| 860,472 | 7/1907 | Hills | 99/597 |
|---|---|---|---|
| 2,599,328 | 6/1952 | Hoenselaar | 99/537 |
| 3,153,436 | 10/1964 | Chesley | 99/538 |
| 3,951,054 | 4/1976 | Frentzel | 99/537 |
| 4,137,839 | 2/1979 | Couture et al. | 99/594 |

Primary Examiner—Harvey C. Hornsby
Assistant Examiner—Timothy F. Simone
Attorney, Agent, or Firm—Fay & Sharpe

[57] ABSTRACT

Apparatus for spirally slicing a cut of meat such as a ham or the like. The meat is retained in a substantially vertical position by means of upper and lower skewers. The lower skewers are powered thus providing for rotation of the cut of meat along a substantially vertical axis. A rotary circular cutting blade is supported by an arm which is generally movable about a vertical axis. A carriage imparts vertical movement to the arm and blade. When the rotary blade is brought into contact with the rotating cut of meat it is caused to be advanced along the axis of rotation of the meat thereby to form a continuous spiral slice in the meat. Sensing and control means are provided limiting both the horizontal and vertical movement of the blade to enable the cut of meat to be sliced about an internal bone.

8 Claims, 12 Drawing Figures

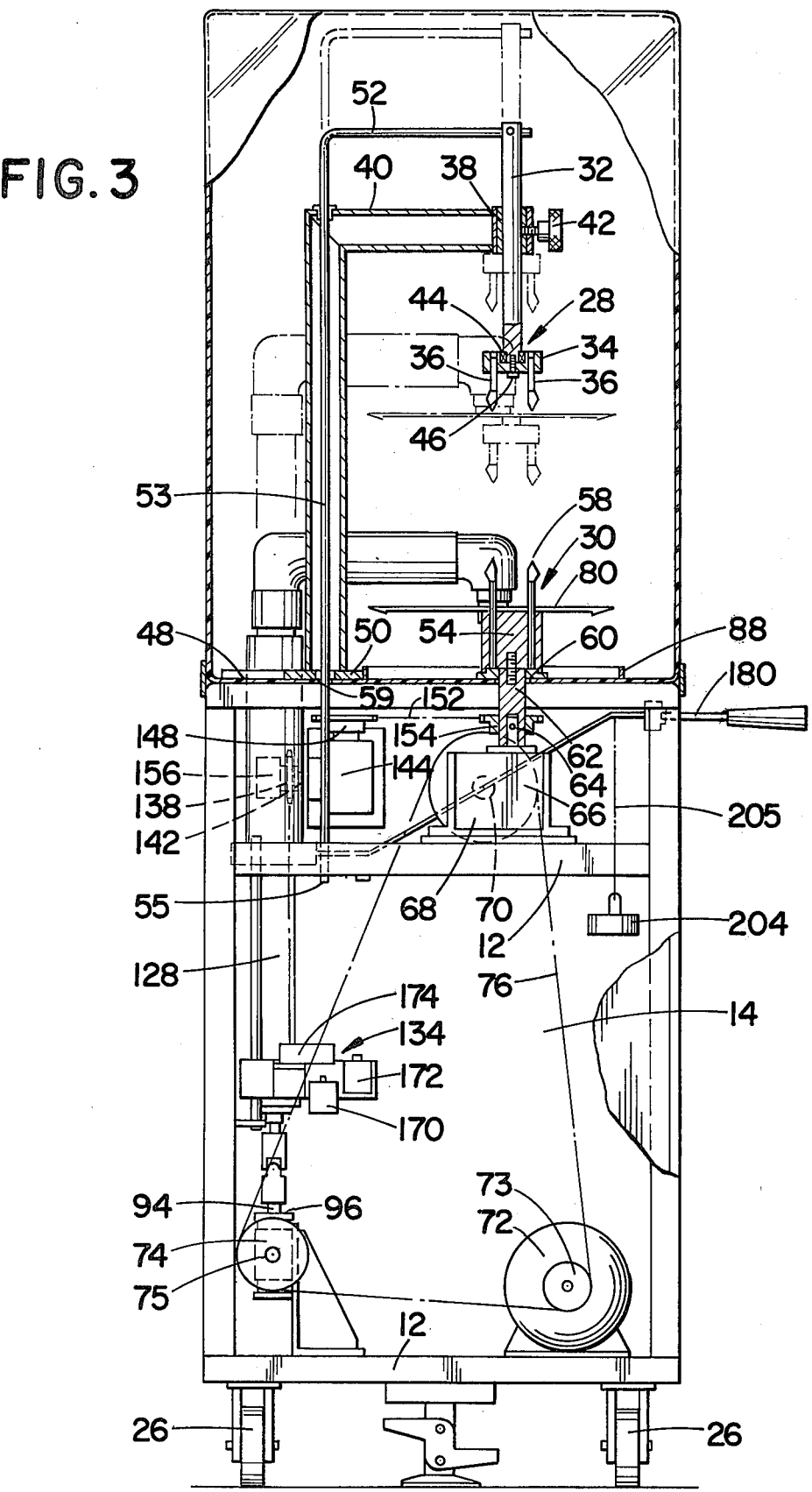

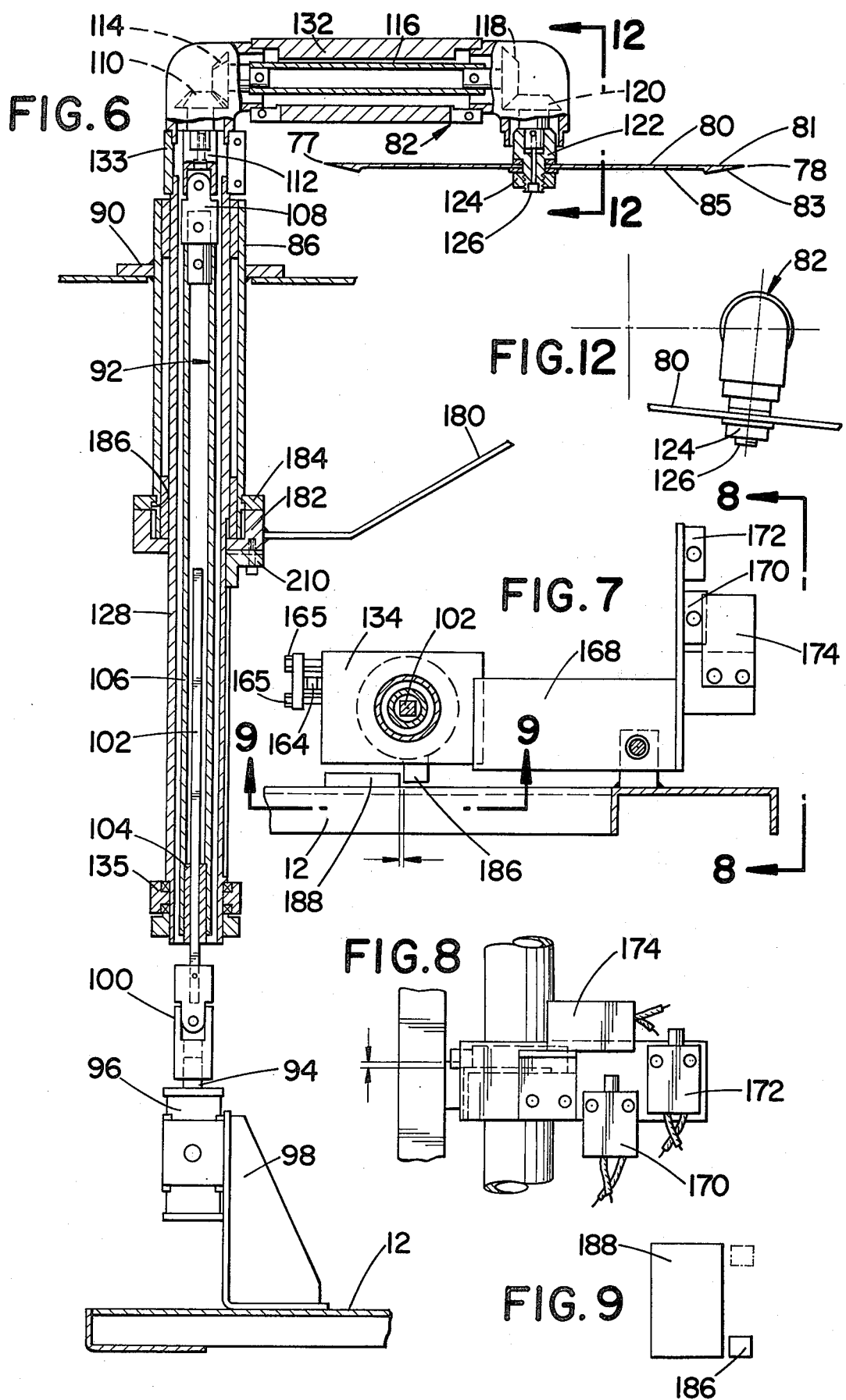

SPIRAL MEAT SLICER

BACKGROUND OF THE INVENTION

This invention relates to apparatus for spirally slicing a cut of meat such as a ham or the like. While the invention will be described with reference to the spiral slicing of ham it should be understood that it is equally applicable to the spiral slicing of other cuts of meat with or without an internal bone.

In the food industry there is a large demand for precooked sliced ham. Such a product is desirable for serving guests at social gatherings of all types. A precooked, presliced ham may be served hot or cold and may be readily enjoyed by guests since it requires no slicing or other preparation.

Spiral slicing of ham has been known to the art for some time. The patents to Hoenselaar, U.S. Pat. No. 2,599,328, and Chesley, U.S. Pat. No. 3,153,436, disclose apparatus for spiral slicing of ham employing a reciprocating knife structure. In Hoenselaar, U.S. Pat. No. 2,599,328, the reciprocating knife is maintained in an essentially horizontal plane while the rotating ham is mounted on a carriage which is adapted to move in a generally upward direction. In Chesley, U.S. Pat. No. 3,153,436, the rotating ham is maintained in an essentially fixed plane whereas the reciprocating knife is mounted on a carriage which is adapted to move upwardly by means of a vertical worm.

There are a number of shortcomings in the prior art structures described above to which applicant has directed his attention in the design of the meat slicer of this invention.

One shortcoming in the prior art systems described above is the reciprocating knife which, in many cases, does not produce a clean, even cut in the meat, particularly in the area of the meat adjacent the ends thereof.

Another shortcoming of the prior art structures described above is the fact that hams of various sizes cannot be readily accommodated without operator attendance.

Applicant's invention overcomes many of the shortcomings of prior art machines including those referenced above.

SUMMARY OF THE INVENTION

Briefly summarized the spiral meat slicer of this invention comprises a frame on which are mounted upper and lower skewers for holding a ham in an essentially vertical position. The lower skewer is powered so that the ham rotates in a vertical position approximately along the center line of the bone. A powered circular cutting blade is supported by an arm which is adapted to pivot about a vertical axis. A carriage structure is provided for raising and lowering the arm. The powered circular blade is thus capable of movement in both a horizontal and vertical direction. Novel control means are provided which limit the degree of horizontal and vertical movement of the blade in order to facilitate slicing of the ham in a manner so as to avoid both the upper and lower skewers as well as the bone.

BRIEF DESCRIPTION OF THE DRAWINGS

A more complete description of the invention will now be made with reference to the accompanying drawings in which:

FIG. 3 is a side elevational view, partly in section, and taken along the line 3—3 of FIG. 2;

FIG. 6 is an elevational view, partly in section, and taken along the line 6—6 of FIG. 2;

FIG. 7 is an elevational view, partly in section, and taken along the line 7—7 of FIG. 2;

FIG. 8 is an elevational view, partly in phantom, and taken along the line 8—8 of FIG. 7;

FIG. 9 is an elevational view, partly in phantom, taken along the line 9—9 of FIG. 7;

FIG. 12 is a schematic view of the blade showing the orientation thereof and taken along the line 12—12 of FIG. 6.

DESCRIPTION OF THE PREFERRED EMBODIMENT

Figure 1:
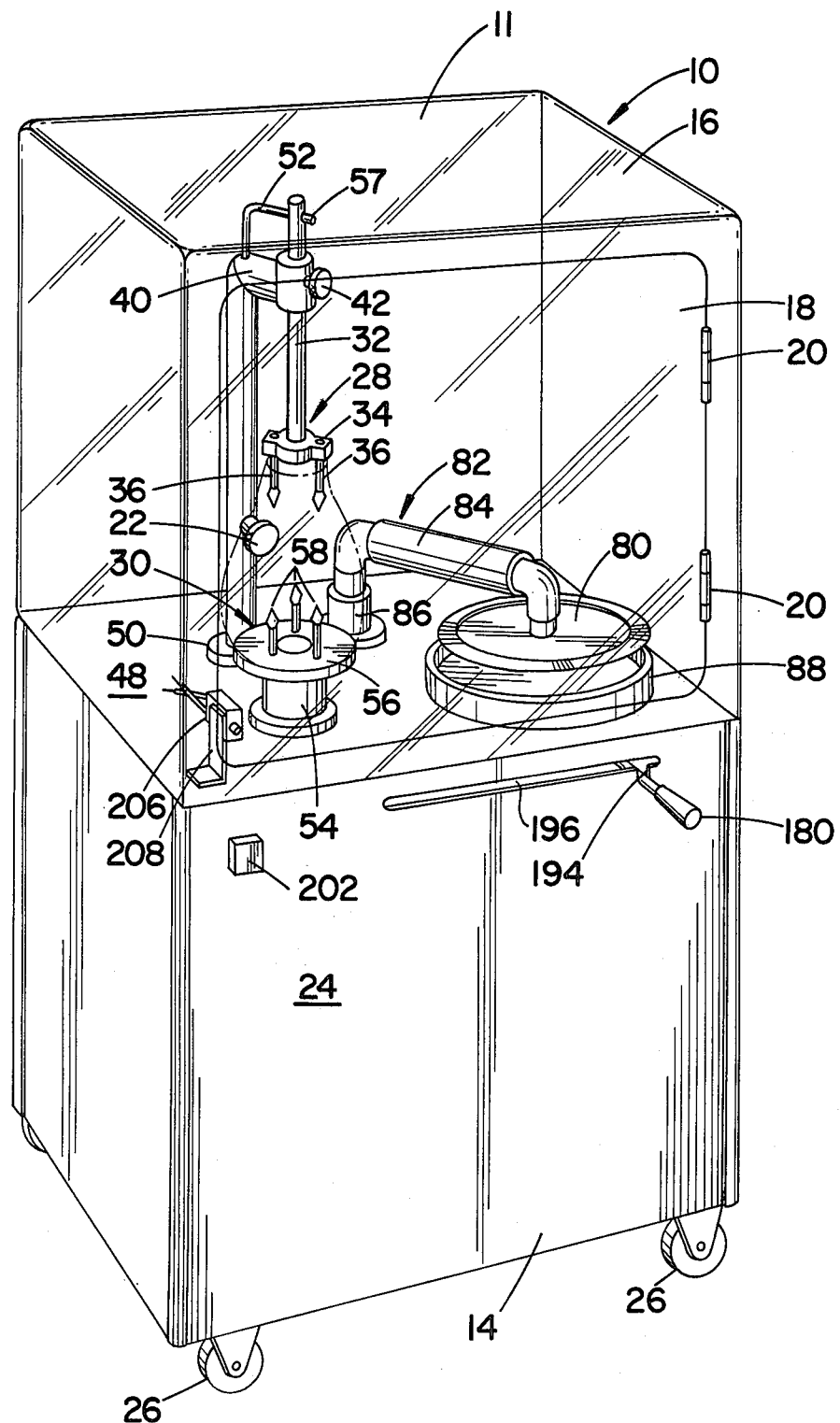
FIG. 1 is an isometric view of the spiral meat slicer of this invention. The upper cover of the slicer and the ham itself are shown in phantom so that the various elements of the slicer may be more clearly seen.

Turning now to FIG. 1 the preferred embodiment of the invention will be described with reference to the slicing of a ham which includes an internal bone. It should be appreciated, however, that this invention is broadly applicable to the slicing of meat of all types including in addition to ham, legs of lamb, beef, and other similar cuts of meat. In addition, the invention is applicable to cuts of meat with or without a center bone. For ease of description the invention will be described with reference to the spiral slicing of ham including a center bone. It should be understood, however, that the invention should not be considered limited to apparatus for the spiral slicing of ham.

In FIG. 1 the spiral meat slicer of this invention is broadly designated 10 and includes an upper cabinet 11 and a lower cabinet 14. Upper cabinet 1 is defined by an upper cover 16 which includes an access door 18 hinged to cover 16 at 20. A knob 22 is provided to facilitate the opening and closing of the door 18.

The lower cabinet 14 is enclosed by lower cover 24 which substantially surrounds the operating elements disposed within the lower cabinet 14. A plurality of casters 26 are provided at the bottom wall of the lower cabinet 14 to facilitate movement of the meat slicer over a floor.

There are a number of diverse functions that are provided by the several elements of the meat slicer of this invention. For ease of description the invention will be described in terms of the several functions provided by the numerous elements of the apparatus of the invention.

Means to Retain the Meat

The first elements to be described with respect to the invention are those which are employed to retain the cut of meat in a substantially vertical position as shown in phantom in FIG. 1. Upper and lower skewer holder means 28, 30 are employed which are approximately concentric in a vertical plane and which engage the cut of meat so as to retain the meat in a substantially vertical position as shown in FIG. 1. The upper skewer holder means 28 is defined by a skewer shaft 32 and a rotatable head 34. A pair of skewers 36 are screw threadedly received within head 34 and are directed in a downward direction as viewed in FIG. 1. Skewer shaft 32 is received within bushing 38 (FIG. 3) retained by support post 40. A thumbscrew 42 is threadedly received in the support post 40 and is adapted to engage the external surface of skewer shaft 32. It should be appreciated from a study of FIGS. 1 and 3 that skewer shaft 32 may be moved vertically with respect to support post 40 in order to provide for height adjustment of the skewers 36 and the rotatable head 34.

A bearing 44 (FIG. 3) is provided at the head 34 of the skewer shaft. The head 34 is thus rotatably received at the end of the skewer shaft 32 by means of pin 46. As a consequence the head 34 is free to rotate relative to the skewer shaft 32 at such time as the skewer shaft 32 is locked or fixed to the support post 40 by means of thumbscrew 42.

Several alternative vertical positions of the upper skewer holder means 28 are shown in phantom in FIG. 3.

Support post 40 is generally hollow as will be evident from a study of FIG. 3. The post is secured to the wall 48 of the lower cabinet 14 by bolting flange 50 of the support post to wall 48 as may be seen in FIGS. 3 and 4. The flange itself is welded to the support post although other means of attachment may be used by those skilled in the art.

Extending from the upper portion of the skewer shaft 32 is a generally L-shaped tripper rod 52. As best seen in FIG. 1 the upper end 57 of the tripper rod 52 extends through an aperture defined in the skewer shaft 32. The leg portion 53 of the tripper rod (FIG. 3) passes through the hollow support post 40, through an aperture 59 in the wall 48 and into the lower cabinet 14 for a purpose to be described more fully hereafter. It should be appreciated from FIG. 3 that raising and lowering of skewer shaft 32 as by adjustment of the thumbscrew 42 causes the tripper rod 52 to be raised or lowered accordingly.

Turning now to the lower skewer holder means 30 it will be seen from FIGS. 1 and 3 that such means are defined by a drive post 54 from which flange 56 extends. A plurality of upwardly directed skewers 58 are screw threadedly received in the flange 56 and drive post 54. A connecting flange 60 is provided at the lower surface of drive post 54 and is positioned adjacent wall 48 of the lower cabinet 14. As best seen in FIG. 3 drive post 54 and connecting flange 60 are adapted to rotate by reason of drive shaft means 62 which extends through wall 48 of lower cabinet 14. Drive shaft means 62 are connected to the output 64 of worm gear reducer 66.

From the description thus far it can be appreciated that the meat retaining means of the invention comprises upper and lower skewer holding means. In order to place the ham in the slicer the operator forces the ham onto the skewers 58 of the lower skewer holder means 30. While supporting the ham with one hand the operator then forces the skewers 36 of the upper skewer holder means 28 into the ham after first loosening thumbscrew 42. Having forced the skewers 36 into the ham as shown in FIG. 1 the operator then tightens the thumbscrew 42 which causes the ham to be positioned and fixed in a substantially vertical position.

Means to Rotate the Meat

Rotation of the meat in the slicer of this invention is accomplished by providing rotary power to the lower skewer holder means 30. Referring to FIG. 3 it will be remembered that the output shaft 64 of the worm gear reducer 66 is connected to drive shaft means 62 which, in turn, is connected to flange 60 and drive post 54. Input rotation to the worm gear reducer 66 is provided by means of pulley 68 which is attached to the input shaft 70 of the gear reducer 66. An electric motor 72 is affixed to the frame 12 and is adapted to drive pulley 68 by means of drive belt 76. A pulley 73 provides for rotation of belt 76.

To recap, energization of motor 72 produces rotation of pulley 68 and the lower skewer holder means 30. Since head 34 of the upper skewer holder means 28 is free to rotate relative to skewer shaft 32 rotation of the lower skewer holder means 30 produces free rotation of the ham.

In the preferred manner of operation of the ham slicer of this invention the ham is positioned with the aitch bone approximately adjacent flange 56 of the lower skewer holder means 30 and with the leg bone of the ham in approximately a vertical position concentric with the axis of rotation of drive post 54 and the axis of the rotatable head 34.

Means to Drive the Cutting Blade

Before describing the blade drive mechanism of this invention attention will first be directed to FIG. 1 wherein it will be seen that circular blade 80 is supported by arm 82 which is defined generally by a horizontal extension 84 and a vertical support 86. A blade guard 88 is defined at the wall 48 of lower cabinet 14 in order to receive blade 80 when in a retracted position. The function of blade guard 88 is to closely surround the cutting edge of blade 80 thus to prevent accidental contact with the cutting edge by the operator. In the position shown in FIG. 1 the blade 80 is slightly retracted from the blade guard.

Blade 80 in the slicer of this invention is capable of movement in both a horizontal and vertical direction. Before describing such movements, however, reference will first be made to the drive means by which rotation is imparted to the blade.

Referring to FIG. 6 it will be seen that the stationary vertical support 86 includes an outwardly extending flange 90 welded to the support 86. Flange 90, in turn, is secured to wall 48 by means of bolts 91 (FIG. 4) or other attaching means well knwon to those skilled in the art.

Extending through the fixed vertical support 86 is a rotatable drive train generally designated 92. Rotary input to drive train 92 is provided by the output shaft 94 of the worm gear reducer 96. Worm gear reducer 96 is, in turn, secured to bracket 98 which extends from the frame 12. Although not shown in FIG. 6 it should be appreciated from a study of FIG. 3 that input rotation to the worm gear reducer 96 is provided by means of pulley 74 attached to input shaft 75. Pulley 74 is rotated by drive belt 76. Rotation of pulley 74 therefore produces rotation of the output shaft 94 and, subsequently, the entire drive train 92 which provides a direct mechanical connection to blade 80 producing rotation thereof.

Drive train 92 of FIG. 6 is made up of a plurality of interconnected mechanical elements starting with a universal joint 100 which is secured to the output shaft 94 of the worm gear reducer 96. A drive pin 102 extends from the universal joint 100 and is slidably received within bushing 104 which is affixed to drive shaft 106. It should be appreciated that the external cross section of drive pin 102 is non-circular. In the preferred embodiment the external cross section of pin 102 is square as may be seen in FIG. 7. The internal surface of bushing 104 of FIG. 6 is complementary to the external surface of pin 102 so that rotation of pin 102 produces rotation of the bushing and, subsequently, the drive shaft 106. The drive pin 102 is slidably received within the bushing 104, however, so that a vertical height adjustment of the blade may be made as will be described more fully hereafter.

Continuing with the description of drive train 102 it will be seen from FIG. 6 that drive shaft 106 extends into the vertical support 86. At the upper end of drive shaft 106 there is provided a universal joint 108. A coupling member 112 and bevel gear 110 extend from universal joint 108. Bevel gear 110 is complementary to bevel gear 114 (disposed at a right angle with respect to bevel gear 110) which is connected to drive coupling 116. At the outer end of drive coupling 116 there is provided a bevel gear 118 which is complementary to bevel gear 120 disposed at a right angle thereto. In turn bevel gear 120 is secured to blade holder 122. The blade 80 itself is secured to holder 122 by means of a jamb nut 124 and fastener 126.

The several elements of the drive train 92 just described are all interconnected by means of suitable roll pins, fasteners and the like. It should be appreciated that there is provided a direct mechanical interconnection between blade 80 and the output shaft 94 of gear reducer 96 so that upon the application of rotary power to the gear reducer 96 there is accomplished rotation of the blade 80.

Again referring to FIG. 6 it will be seen that shaft sleeve 128 is received within vertical support 86 and surrounds a portion of the drive train 92. Suitable bushings are disposed between vertical support 86 and shaft sleeve 128. It should be understood that shaft sleeve 128 is free to move or slide in a vertical direction (as seen in FIG. 6). Since the housing 132 of arm 82 is connected to shaft sleeve 128 at coupling 133 it can be appreciated that movement of the shaft sleeve 128 in an upward direction (as seen in FIG. 6) produces upward movement of arm 82 and blade 80. The actuating means for producing such vertical movement will be described below.

In summary, rotation of blade 80 is accomplished by a direct mechanical interconnection between the blade and worm gear reducer 96 which is driven by drive belt 76 and motor 72.

From the description of the invention thus far, and from a review of FIG. 3, it can be appreciated that drive motor 72 and drive belt 76 provide for simultaneous rotary input to the pair of gear reducers 66, 96. Gear reducer 66, in turn, provides for rotation of the lower skewer holder means 30 which rotates the ham. Gear reducer 96 provides for rotation of the drive train 92 (FIG. 6) which rotates or powers the blade 80.

Vertical Movement of the Blade Carriage

Attention will now be directed to those actuating elements of the invention providing for vertical or up and down movement of the blade. Such movement is generally accomplished by means of a carriage 134 (FIG. 2) which is rotatably secured to the external surface of shaft sleeve 128. Carriage 134 is engaged at 164 by an endless roller chain 136 supported by drive sprocket 138 and idler sprocket 140. Drive sprocket 138 is interconnected to the output shaft 142 of a worm gear reducer 144. Gear reducer 144 is, in turn, secured to bracket 146 which is secured to frame 12. Rotary input to gear reducer 144 is provided by means of sprocket 148 which is attached to input shaft 150. Endless chain 152 rotates sprocket 148 from drive sprocket 154. Drive sprocket 154 is secured to drive shaft 62 (FIG. 3) which is, itself, secured to output shaft 64 extending from gear reducer 66. Drive sprocket 154 thus rotates with drive shaft 62 to provide for rotation of sprocket 148. The relationship of sprocket 154 to sprocket 148 may be more clearly seen in FIG. 5. The relationship of sprocket 154 to drive shaft 62 and output shaft 64 may be more clearly seen in FIG. 3.

Turning to FIG. 3 it will be noted that an electric clutch 156 is positioned adjacent sprocket 138 and is supported by the output shaft 142 of worm gear reducer 144. The function of clutch 156 is to selectively interconnect sprocket 138 with the output shaft 142 such that when the clutch is engaged the sprocket 138 will rotate with output shaft 142. Conversely when clutch 156 is disengaged the sprocket 138 will remain stationary and not rotate with the output shaft 142.

Assuming clutch 156 to be engaged sprocket 138 will be caused to rotate upon rotation of drive belt 76.

Figure 2:
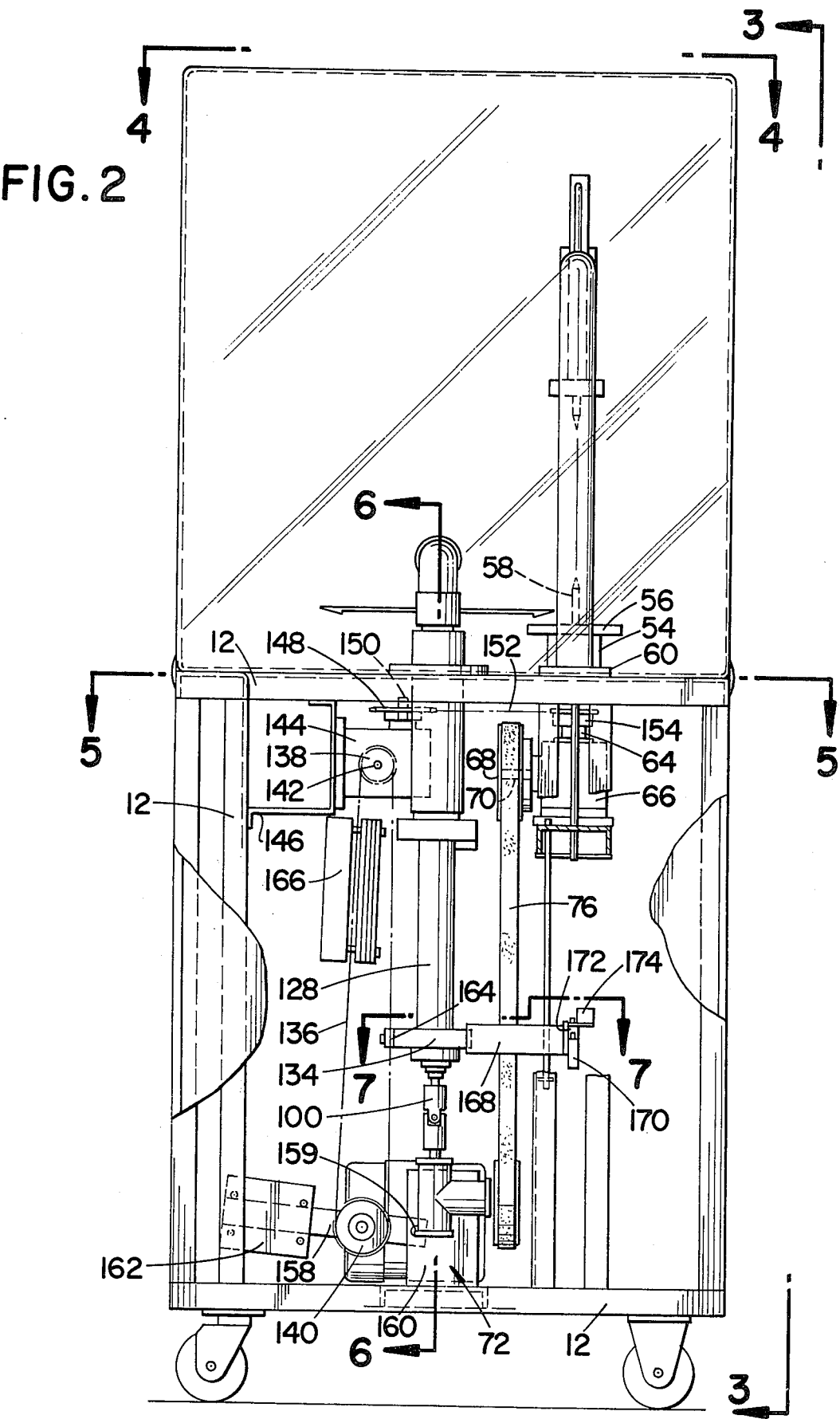
FIG. 2 is a rear elevational view, partly in phantom, and showing the several elements of the slicer of this invention.

As was previously noted chain 136 of FIG. 2 is supported by an upper drive sprocket 138 and a lower idler sprocket 140. Idler sprocket 140 is attached to a floating arm 158 which is pivoted at 159 to bracket 160 extending from frame 12. A tensioning weight 162 is secured to arm 158 and functions to maintain tension in chain 136.

As has previously been noted chain 136 is fastened to carriage 134 at 164. In FIG. 7 it will be noted that fasteners 165 are used for the chain connection. Any suitable attachment means may be used, however.

It should be appreciated from a study of FIG. 2 that counterclockwise rotaton of sprocket 138 will cause carriage 134 to move upwardly. Conversely clutch disengagement will cause carriage 134 to move downwardly. A relatively large counterweight 166 is secured to chain 136 for a purpose to be described more fully hereafter.

To recap, movement of blade 80 in a vertical direction (either upward or downward) is accomplished by movement of shaft sleeve 128. The shaft sleeve is, in turn, controlled by the carriage 134 which is rotatably secured to the shaft sleeve and which is driven by an endless chain 136. Rotation of the chain, in turn, is controlled by the clutch 156 positioned adjacent sprocket 138.

In the preferred embodiment clutch 156 is an electric clutch responsive to an electrical signal. Thus an appropriate control signal is used to either energize or de-energize the clutch as is required. More discussion with respect to the operation of the clutch in this regard will follow below.

As best seen in FIGS. 2 and 7 there is associated with the carriage 134 a bracket 168 which carries a pair of limit switches 170, 172 and a magnetic sensor 174. The function of limit switches 170, 172 is to limit upward movement of the carriage during the slicing operation.

Magnetic sensor 174 functions to control a portion of horizontal movement of the blade as will be described below.

Turning to FIG. 3 it can be seen that limit switch 170 is in approximate alignment with leg 53 of tripper rod 52. Thus as the carriage 134 moves in an upward direction (producing upward movement of blade 80) a point will be reached where the end 55 of tripper rod 52 will contact the detent of limit switch 170. When the normally closed limit switch 170 is opened by end 55 of the tripper rod 52 electrical power to the slicer is interrupted. This, in turn, causes motor 72 to be de-energized. As a consequence rotation of the ham, rotation of the cutting blade and vertical travel of the cutting blade is stopped.

It can be appreciated from a study of FIG. 3 that the upper vertical limit of movement of the carriage is automatically compensated for regardless of the size of ham placed in the skewer holders. Since the tripper rod 52 moves with the skewer shaft 32 it can be seen that the placement of a large ham in the slicer will produce greater vertical movement of the blade than would be the case if a smaller ham were placed in the slicer. This is due to the fact that the placement of a large ham in the slicer will cause the end 55 of the tripper rod 52 to be positioned higher than would be the case if a smaller ham were sliced. There is thus no need for the operator to make a separate height adjustment for vertical travel of the blade based on the size of the ham placed in the slicer.

As previously indicated upward movement of the carriage 134 and, correspondingly, the blade 80 will continue until contact is made by the limit switch 170 with end 55 of the tripper rod 52. If an extremely large size ham is placed in the slicer the limit switch 172 functions to interrupt power to the motor prior to the time contact is made by the limit switch 170 with end 55 of tripper rod 52. This is to prevent extreme overtravel of the carriage. In such event limit switch 172 will contact frame 12 of the slicer in order to interrupt power to the drive motor 72.

To summarize briefly, limit switch 170 cooperates with end 55 of tripper rod 52 to limit upward travel of the blade. Tripper rod 52 automatically provides for varying degrees of vertical travel of the carriage depending upon the size of the ham being placed in the slicer. In the event an extremely large ham is placed in the slicer, limit switch 172 will make contact with frame 12 of the slicer prior to the time that limit switch 170 contacts end 55 of the tripper rod. Limit switch 172 thus functions to prevent extreme overtravel or excessive upward travel of the blade.

The magnetic sensor 174 functions to adjust horizontal movement of the blade as will be described further below.

Horizontal Movement of the Blade

Figure 4:
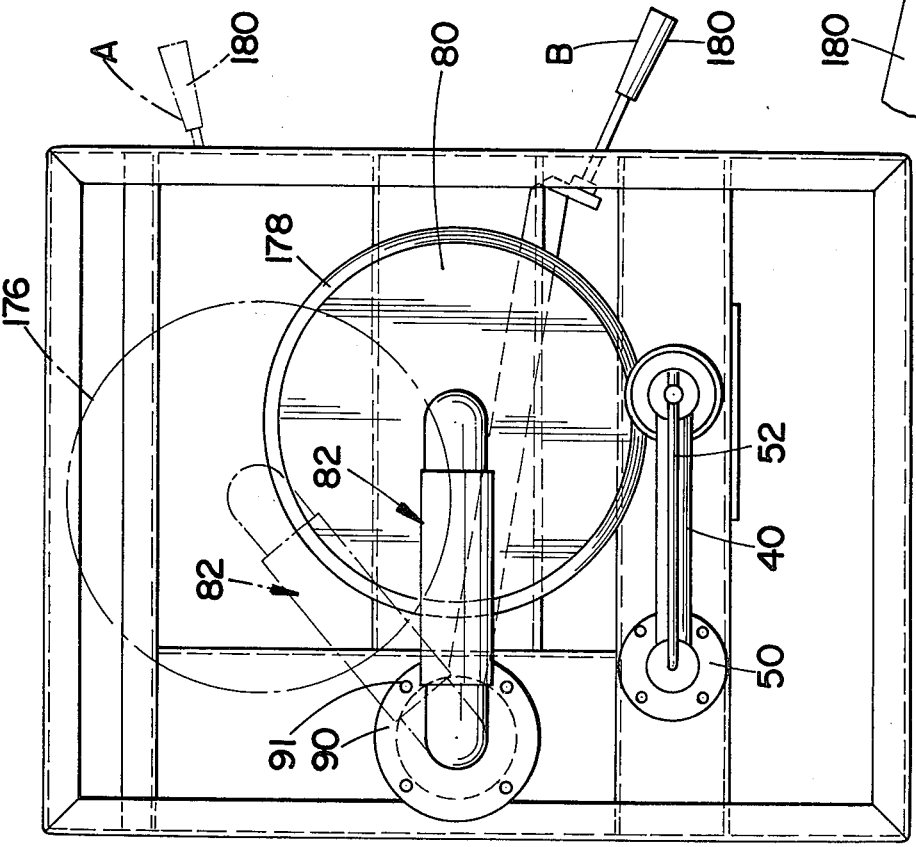
FIG. 4 is a top elevational view, partly in phantom, taken along the line 4—4 of FIG. 2.

Horizontal movement of the blade is shown generally in FIG. 4. Within limits the blade is capable of horizontal movement from a rest position 176 shown in phantom in FIG. 4 to a slicing position 178. Horizontal movement is generally accomplished by means of movement of the shaft sleeve 128 (FIGS. 2 and 3) about a vertical axis of rotation. Such horizontal movement is accomplished by means of lever 180 and a bias force imparted to the lever as will be described below.

It was earlier noted that carriage 134 (FIGS. 2 and 3) was rotatably secured to the external surface of shaft sleeve 128. Two bearings 135 (FIG. 6) are provided between the carriage and the shaft sleeve for this purpose. It should therefore be understood that carriage 134 is fixed to shaft sleeve 128 in a vertical direction but the sleeve is free to rotate within the carriage.

With reference to FIG. 6 it should be appreciated that a collar 182 is keyed to the external surface of shaft sleeve 128. Lever 180 is, in turn, welded to collar 182. Because of the fact that the collar 182 is keyed (at 210) to the shaft sleeve 128 it should be understood that movement of the lever 180 (in the direction shown in FIG. 4) will produce corresponding movement of the shaft sleeve 128 and, thus, the blade 80. The keyed relationship of the collar 182 and the shaft sleeve 128 permits, however, sliding movement of the shaft sleeve 128 within the collar 182 during raising and lowering of the blade. Support for the collar 182 is provided by flange member 184 which engages a complementary shoulder 186 of vertical support 86.

To summarize, movement of lever 180 from the position designated "A" in FIG. 4 to the position designated "B" produces corresponding movement of the blade 80 in a horizontal direction from position 176 to position 178.

Limits on Horizontal Movement

Referring to FIG. 1 this invention provides that the blade 80 will not move in a horizontal direction so as to make contact with the lower skewer holder means 30 until such time as the blade has cleared the tips of the skewers 58 in a vertical direction. There is provided in the vertical carriage 134 a stop mechanism wherein horizontal movement of the blade toward the skewers 58 will be limited until such time as the blade has cleared the tips of the skewers. As best seen in FIGS. 7 and 9 the stop mechanism consists of a lock stop collar 186 attached to the shaft sleeve 128 which cooperates with a set stop 188. Set stop 188 is attached to the frame 12 of the slicer. It can be seen in FIG. 9 that until such time as the lock stop collar 186 vertically clears the set stop 188 it is not possible to provide for horizontal movement of the blade. The degree of vertical travel may be varied by adjusting the height of the set stop 188. The point at which the lock stop collar 186 clears the set stop 188 is shown in phantom in FIG. 9. This position denotes the fact that sufficient vertical travel has taken place in the carriage to permit the blade to be brought into slicing engagement with the ham so as to clear the lower skewers.

What has just been described in connection with the lock stop collar and set stop of FIG. 7 is a means to limit the initial horizontal movement of the blade until such time as sufficient vertical travel has been imparted to the blade to cause the blade to clear the lower skewers 58.

There is a further limiting of the horizontal movement of the blade which is provided for in this invention which will now be described in connection with the end of the slicing operation. It can be appreciated from a study of FIG. 1 that as vertical or upward travel of the blade progresses a point will be reached where the blade could make contact with the upper skewers 36. Just prior to the time that the blade would make contact with the upper skewers 36 this invention provides for a means by which the blade is caused to move horizontally outwardly a slight distance permitting the blade to clear the skewers but yet, at the same time, permitting spiral slicing to continue.

Referring to FIG. 3 it will be remembered that upward movement of the carriage 134 continues until such time as the limit switch 170 contacts end 55 of the tripper rod 52 (or in the case of an extremely large ham until limit switch 172 contacts frame 12). Before the time that contact of the tripper rod with the limit switch 170 is made, however, the tripper rod will come in close proximity to the magnetic sensor 174. The relationship of the magnetic sensor 174 to the tripper rod 52 is such that the magnetic sensor will be in close proximity to the tripper rod at a time when the blade 80 is in close proximity to the upper skewers 36. When the magnetic sensor 174 is tripped by the end 55 of tripper rod 52 a signal is then sent to a relay and an electromagnet to immediately move the lever 180 in a manner so as to move the blade away from the skewers. While not shown in FIG. 5 in the interest of clarity it should be appreciated from a study of FIG. 10 that an electromagnet 190 is energized by the magnetic sensor 174 causing the plunger 192 to move the lever 180 a sufficient distance horizontally such that blade 80 clears the upper skewers 36.

This invention, therefore, provides for limitations in the horizontal movement of the blade both at the beginning and the end of the slicing operation. At the beginning of the slicing operation as the blade is removed vertically from the blade guard 88 (FIG. 1) the lock stop collar 186 and set stop 188 (FIGS. 7 and 9) prevent horizontal movement of the blade into the lower skewers 58 until such time as sufficient vertical travel has been imparted to the blade to permit the blade to clear the lower skewers.

Figure 10:
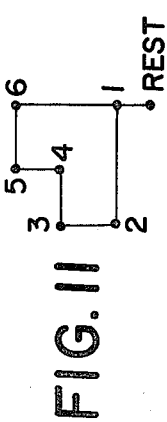
FIG. 10 is an elevational view showing a portion of the operating lever.

At the upper end of vertical travel of the blade 80 there is provided a means to take the blade out of potential contact with the upper skewers 36. Such means are shown in FIG. 10 and comprise an electromagnet and plunger activated by a magnetic sensor 174 carried by the vertical carriage 134.

Blade

As seen in FIG. 6 blade 80 has a generally planar upper surface 81 and a tapered edge 83 which defines approximately a 7° angle with surface 81. A bottom surface 85 extends generally parallel to surface 81.

The blade 80 as shown in FIG. 6 is mounted at a slight angle with respect to the horizontal plane of wall 48 so as to make an angle of intersection of approximately $1\frac{1}{2}°$ with the horizontal plane. That is to say the edge of the blade closest to the vertical support 86 in FIG. 6 (designated 77) is slightly elevated from the opposite edge (designated 78). Additionally, FIG. 12 shows the blade 80 tilted approximately 1° relative to the vertical axis of the ham in a plane different than shown in FIG. 6. This relationship facilitates the spiral slicing operation.

Function of Lever 180

Attention will now be directed to the function of lever 180 insofar as the slicing operation.

Figure 5:
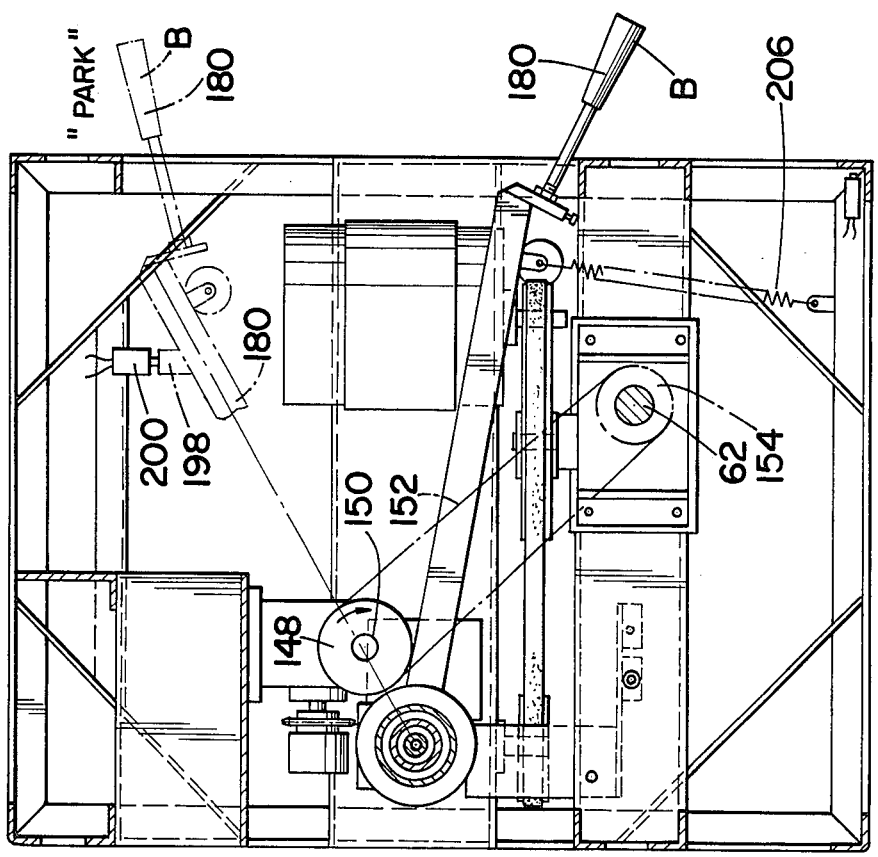
FIG. 5 is an elevational view, partly in section, and partly in phantom, taken along the line 5—5 of FIG. 2.

When the slicer is at rest and not energized, lever 180 is in the position shown in FIG. 1 which is termed the "park" position. In this position the lever is received in a cutout 194 which extends from slot 196. The "park" position of lever 180 is also shown in FIG. 5 in phantom. In such position an extension 198 (FIG. 5) of lever 180 makes contact with limit switch 200. Limit switch 200 is normally closed. With the lever 180 in the "park" position as shown in FIG. 5 limit switch 200 is open and thus interrupts electrical current to the electric clutch 156.

Vertical and horizontal movement of the blade 80 is accomplished by lifting lever 180 out of the cutout 194 and causing the lever to ride in the slot 196.

Assume at this point that power to the slicer has been turned on by depressing the switch 202 (FIG. 1). With power on there will be rotation of the drive belt 76 (FIG. 3) and rotation of the ham and the blade 80. There will also be rotation of the sprockets 154, 148 (FIG. 3). Because of the fact that lever 180 is in the "park" position the limit switch 200 (FIG. 5) will cause the electric clutch 156 to be disengaged. Thus sprocket 138 will not be rotating. Nor will sprocket 140 (FIG. 2).

By lifting lever 180 out of cutout 194 and causing the lever to move a slight distance to the left in slot 196 limit switch 200 (FIG. 5) will close causing power to be transmitted to the electric clutch 156. Consequently the clutch will become engaged causing the sprocket 138 and chain 136 (FIG. 2) to rotate in a counterclockwise direction. Such rotation of the chain will start an upward or vertical travel of the carriage 134 and, consequently, the blade 80. Such upward travel of the carriage and blade will continue until such time as the lock stop collar 186 clears the set stop 188 (FIG. 9). At this point in time the blade 80 will have undergone sufficient vertical travel that it will have cleared the lower skewers 58 and, accordingly, may then be brought into slicing engagement with the ham.

A bias force is applied to the lever 180 by means of weight 204 (FIG. 3). The weight is attached to line 205 which is attached to the lever. The line is extended over a pulley in the lower cabinet 14. In lieu of a weight a bias spring 206 may be utilized as shown in FIG. 5. The function of the weight (or spring, whichever is selected) is to move the lever to the left of FIG. 1 in slot 196 (once the lever is removed from cutout 194) to bring the blade into slicing engagement with the ham.

There is no necessity for the operator to maintain hand contact with the lever 180 once it is removed from the cutout 194 as the lever will ride freely in the slot 196 under the influence of the bias force acting on the lever.

As the ham rotates, the blade 80 (which is brought into slicing engagement with the ham due to the bias on the lever) is moved vertically upwardly thereby causing it to advance along the axis of rotation of the ham to form a continuous spiral slice in the meat.

At such time as the upper limit of slicing is reached the magnetic sensor 174 will be activated by the end 55 of the tripper rod 52. At such point the electromagnet 190 (FIG. 10) will be activated causing the blade to be moved to the right of FIG. 1 and out of potential contact with the upper skewers 36. Upward travel of the blade will continue, however, and, consequently, slicing will continue until such time as the limit switch 170 contacts the tripper rod or, alternately, limit switch 172 contacts the frame of the apparatus. At such time as either one of the limit switches 170, 172 are opened power to the unit will be interrupted. The blade will thus stop turning as will the ham. The operator then moves the lever 180 to the right in FIG. 1 into the cutout 194 or to the "park" position. Consequently the blade 80 will be moved to the right. When the lever is placed in the "park" position the limit switch 200 will open causing power to the electric clutch 156 to be interrupted. At this point in time the sprocket 138 will become free wheeling and the carriage 134 and the arm 82 and blade 80 will retract into a rest position under their own weight. The counterweight 166 attached to chain 136 (FIG. 2) functions to balance the arm and blade during this operation.

Summary of Control Apparatus

The electrical and mechanical controls of this invention provide for a unique relationship of the several elements of the apparatus cooperating to produce a superior sliced ham product.

The several controls contributing to the apparatus of this invention will be briefly reviewed.

The power switch 202 (FIG. 1) provides for the control of power to the unit. The clutch 156 is controlled by lever 80 and a master switch not shown. After the ham has been placed in the skewers, the switch is closed. The motor 72 is energized producing rotation of the ham and rotation of the blade 80. There is, however, no vertical rotation of the blade 80 out of the blade guard 88 (FIG. 1) until movement of lever 180 out of the "park" position as shown in FIG. 1.

While not previously described there is in the upper cabinet 11 a limit switch 206 (FIG. 1) supported by bracket 208. This limit switch serves to interrupt power to the unit when the access door 18 is opened and is provided for the safety of the operator.

By raising lever 180 out of the cutout 194 and by causing the lever to move a slight distance to the left in slot 196 the limit switch 200 (FIG. 5) will close causing the electric clutch 156 to become engaged. This in turn starts an upward or vertical travel of the carriage 134 and the balde out of the blade guard 88. Vertical movement of the blade will continue until such time as the lock stop collar 186 (FIG. 9) clears the set stop 188. At such time as the set stop is cleared the lever 180 will, without operator assistance, move to the left in slot 196 under the influence of the bias force. The bias force may take the form of a weight 204 (FIG. 3) or a spring 206 (FIG. 5). Such bias force acting on the lever 180 causes the blade 80 to be brought into slicing engagement with the ham.

As slicing starts the blade 80 moves upwardly. Since the ham is rotating there is thus imparted a spiral slicing motion to the ham.

Slicing continues until such time as the end 55 of tripper rod 52 comes into close proximity to the magnetic sensor 174. At this point the electromagnet 190 (FIG. 10) is energized causing the lever 180 to be moved a slight distance to the right in slot 196 (FIG. 1) so that the blade 80 will clear the upper skewers 36. Upward or vertical travel of the blade continues, however, (and slicing continues although not as deep as before) until such time as the end 55 of tripper rod 52 contacts limit switch 170 or until the limit switch 172 contacts frame 12 (whichever comes first). At such time as either one of the limit switches 170, 172 are opened power to the motor 72 will be interrupted thus causing rotation of the ham and blade to cease. In addition further vertical or upward movement of the blade will cease.

At this point in time the operator manually moves lever 180 to the right of FIG. 1 into the "park" position. Such movement of lever 180 causes blade 80 to be brought out of engagement with the ham to a position above the blade guard 88. When brought in the park position the lever 180 will cause the limit switch 200 (FIG. 5) to open thus deenergizing the electric clutch 156. As a consequence the carriage 134 moves downwardly and the arm 82 and blade 80 will return to a park or rest position with the blade 80 within blade guard 88. Movement of the arm and blade in the downward direction is accomplished due to the weight of the blade and arm 82 in cooperation with the counterweight 166.

Finally the operator opens the access door 18 and removes the ham by retracting the upper skewer holder means 28 (by loosening thumbscrew 42) and lifting the ham from the lower skewer holder means 30.

Blade Motion

The motion of the circular blade of this invention in both the horizontal and vertical directions is adapted to accommodate both the ham being sliced and the skewer holders retaining the ham in a vertical position. The several control features of the invention provide for the unusual motion of the blade in a manner that does not require operator assistance. Indeed the operator need merely place the ham in the skewer holders and start the slicer. Blade motion is fully automatic from that point in time.

Figure 11:
FIG. 11 is a schematic view showing the various positions of the rotating blade of the slicer of this invention.

In FIG. 11 there is shown a schematic representation of the vertical and horizontal movements of the blade from the rest position.

The motion of the blade from the "rest" position to position 1 represents that portion of vertical blade travel while the blade clears the guard 88 and until such time as the lock stop collar 186 clears the set stop 188 (FIG. 9).

The horizontal motion of the blade from position 1 to position 2 of FIG. 11 denotes movement of the blade into slicing engagement with the ham under the influence of the bias force imparted to the lever 180.

The vertical motion of the blade from position 2 to position 3 denotes the slicing operation as the blade is moved vertically upwardly by the powered carriage 134.

The horizontal motion of the blade from position 3 to position 4 denotes that motion of the blade that takes place as the blade nears the upper skewers 36 and is moved outwardly by the electromagnet 190 (FIG. 10) in response to sensor 174.

The vertical movement of the blade from position 4 to position 5 denotes the portion of the slicing operation as slicing is completed and just prior to the time that the limit switch 170 is tripped by the tripper rod 52. The final travel of the blade from position 5, through position 6, and finally to the rest position takes place as the operator moves the lever 180 into the park position and the clutch 156 is de-energized.

The vertical and horizontal motions of the blade described generally above may be altered to suit individual requirements. Indeed where unusual bone structure may be present in a cut of meat it is possible to provide for varying degrees of horizontal and vertical movements of the blade during the slicing operation to accommodate such bone structure.

This invention recognizes the desirability and necessity of providing for automatic operation of the blade during the cutting operation in order to accommodate the bone structure of the meat being sliced. The invention also recognizes the desirability of providing for automatic slicing of the meat without operator attendance except insofar as the meat is loaded or unloaded from the slicer. Additionally, if the ham is placed incorrectly on the skewers (the bone being off center) the slicing operation produces a quality cut. The delicate bias force allows the blade to push away and return in a continuous rotary cutting action.

What is claimed is:

1. Apparatus for spirally slicing a cut of meat such as a ham or the like comprising:

a support frame;

upper and lower skewer mounting means on the frame for mounting said cut of meat in substantially a vertical position;

means on said frame to rotate said meat relative to said frame;

means for mounting a circular cutting blade on said frame in substantially a horizontal position;

means for rotating said blade;

means to move said blade vertically from a rest position to a first position a slight vertical distance from said rest position in order to clear said lower skewer mounting means;

means to move said blade horizontally from said first position to a second position into slicing engagement with said meat;

means precluding movement of said blade from said first position to said second position until said blade is vertically above said lower skewer mounting means;

means to move said blade vertically from said second position to a third position, said blade being advanced along the axis of rotation of the meat to form a continuous spiral slice in the meat;

signal means signaling approach of said blade to said upper skewer mounting means;

means responsive to said signal means to move said blade horizontally from the third position to a fourth position outward of said third position to clear said upper skewer mounting means;

means to move said blade vertically from said fourth position to a fifth position defining the upper limit of travel of said blade;

means to terminate vertical travel and blade rotation upon the blade reaching said fifth position;

means to move said blade from said fifth position back to the rest position.

2. The invention of claim 1 wherein said means precluding movement of said blade from said first position to said second position until said blade is vertically above said lower skewer mounting means comprises:

a set stop secured to said frame and a second stop fixed to said means to move said blade vertically from a rest position, said second stop engaging said frame secured set stop throughout the vertical range of movement of the blade from the rest position to just short of said first position whereby horizontal movement of the blade to the second position will be precluded until said second stop moves vertically beyond said set stop, thereby preventing engagement of said blade with the lower skewer mounting means.

3. Apparatus for spirally slicing a cut of meat such as a ham or the like comprising:

a cabinet including a peripheral wall and a top wall;

upper and lower skewer holder means above said top wall to retain a cut of meat in substantially a vertical position;

means to rotate one of said upper and lower skewer holder means thus to rotate the cut of meat;

a circular cutting blade above said top wall;

means mounting said blade rotatably and for horizontal and vertical movement, said mounting means for said blade including a hollow sleeve extending from said blade through said top wall for vertical and rotational movement relative thereto;

means to rotate said blade independently of said sleeve;

means to rotate said sleeve to move said blade substantially horizontally into contact with the meat;

means for moving said sleeve vertically to carry said blade vertically thereby to advance said blade along the axis of rotation of the meat to form a continuous spiral slice in the meat;

said means for moving said sleeve vertically being enclosed within said cabinet, and said means to rotate said blade independently of said sleeve including a motor enclosed by said cabinet and a drive train drivingly connected with and between said motor and said blade, said drive train being concealed within and extending longitudinally through said sleeve.

4. The invention of claim 3 wherein said means to rotate said sleeve includes a horizontally swingable lever operatively connected at one end with said sleeve, said lever extending through a horizontally elongated slot in said cabinet peripheral wall and terminating in an outer end, the horizontal swinging of which effects a rotation of said sleeve, and said sleeve being vertically movable relative to said lever and the sleeve connected end thereof.

5. The invention of claim 4 including means biasing said lever for rotating said sleeve to move said blade into a cut of meat held between said upper and lower skewer holder means, and means for restraining horizontal movement of said blade into the meat as said blade moves past said lower skewer holder means to prevent engagement of said blade with said lower skewer holder means, said restraining means comprising a lock stop collar secured to said sleeve and a set stop secured to said frame, said lock stop collar selectively engaging against said set stop with said set stop precluding rotation of said lock stop collar and the sleeve, said set stop being so positioned and of a vertical height to provide for continuous engagement of the lock stop collar thereagainst until such time as the sleeve is vertically moved so as to advance the blade upward beyond said lower skewer holder means.

6. The invention of claim 5 including limit means for effecting outward horizontal movement of said blade relative to the meat as said blade moves past said upper skewer holder means to prevent engagement of said blade with said upper skewer holder means, said limit means comprising switch means mounted on said sleeve for vertical travel therewith, and a tripper member associated with said upper skewer holder means and positioned within the path of travel of the switch means for selective engagement therewith as the sleeve carries the blade to a height approaching the position of the upper skewer holder means, and an actuator, responsive to engagement of the switch means with the tripper member, to move said blade horizontally outward relative to the meat, said tripper member, switch means and actuator allowing continued vertical upward movement of the blade subsequent to the horizontal outward movement thereof.

7. The invention of claim 3 wherein the drive train is selectively vertically extensible to accommodate vertical movement of the sleeve and blade, and at the same time remain drivingly connected between the motor and blade.

8. Apparatus for spirally slicing a cut of meat such as a ham or the like comprising:
- a frame;
- upper and lower skewer holder means to retain a cut of meat in substantially a vertical position;
- means for vertically adjusting said upper skewer holder means for varying the spacing between said upper and lower skewer holder means;
- means to rotate said lower skewer holder means thus to rotate the cut of meat;
- a circular cutting blade;
- means to rotate said blade;
- means to move said blade horizontally toward and away from contact with the meat;
- carriage means for moving said blade vertically thereby to advance said blade along the axis of rotation of the meat to form a continuous spiral slice in the meat;
- vertical limit means for limiting the upward travel of said blade and comprising a tripper member fixed to and extending from said upper skewer member for vertical adjustment therewith, and a limit switch carried by said carriage means and selectively engageable with the tripper member upon vertical advancement of the blade by the carriage means;
- said vertical limit means thereby being responsive to the position of said upper skewer holder means for automatically varying the upward travel limit of said blade in accordance with the position of said upper skewer holder means; and,
- horizontal limit means to automatically effect horizontal movement of said blade some predetermined distance outwardly from the axis of rotation of said meat at some predetermined position of blade vertical movement prior to said blade reaching its upward limit of travel, said horizontal limit means comprising a magnetic sensor on said carriage means responsive to said tripper member upon approach thereto to generate a signal and an electromagnetic actuator responsive to said signal to cause said horizontal movement.

* * * * *